United States Patent
Uchikawa

[19]

[11] Patent Number: 5,991,599
[45] Date of Patent: Nov. 23, 1999

[54] MOBILE SATELLITE COMMUNICATION TERMINAL

[75] Inventor: Setomi Uchikawa, Tokyo, Japan

[73] Assignee: NEC Corporation, Japan

[21] Appl. No.: 08/979,082

[22] Filed: Nov. 26, 1997

Related U.S. Application Data

[63] Continuation of application No. 08/592,690, Jan. 26, 1996, abandoned.

[30] Foreign Application Priority Data

Jan. 27, 1996 [JP] Japan .................................. 7-011341

[51] Int. Cl.$^6$ ....................................................... H04B 1/40
[52] U.S. Cl. ............................ 455/20; 455/11.1; 455/93; 455/553; 455/575; 455/349
[58] Field of Search .................................. 455/11.1, 12.1, 455/13.1, 15, 20, 66, 74, 84, 93, 129, 550, 552, 553, 575, 426, 427, 21, 25, 562, 349

[56] References Cited

U.S. PATENT DOCUMENTS

| | | | |
|---|---|---|---|
| 5,008,925 | 4/1991 | Pireh | 455/340 |
| 5,119,504 | 6/1992 | Durboraw, III | 455/89 |
| 5,490,284 | 2/1996 | Itoh et al. | 455/11.1 |
| 5,524,044 | 6/1996 | Takeda | 455/89 |
| 5,524,284 | 6/1996 | Marcou et al. | 455/349 |
| 5,535,430 | 7/1996 | Aoki et al. | 455/89 |
| 5,535,432 | 7/1996 | Dent | 455/12.1 |
| 5,564,076 | 10/1996 | Auvray | 455/89 |
| 5,603,080 | 2/1997 | Kallander et al. | 455/15 |
| 5,628,049 | 5/1997 | Suemitsu | 455/11.1 |
| 5,828,951 | 10/1998 | Suemitsu | 455/12.1 |

OTHER PUBLICATIONS

R. Subramanian et al., "Inmarsat–M Portable MES" Pacific Telecommunications Council Fifteenth Annual Conference Proceedings, PTC 1993, vol. 11, pp. 835–840.

*Primary Examiner*—Doris H. To
*Assistant Examiner*—Lester G. Kincaid
*Attorney, Agent, or Firm*—Ostrolenk, Faber, Gerb & Soffen, LLP

[57] ABSTRACT

A mobile satellite communication terminal capable of performing satellite communication both indoors and outdoors. In an indoor mode, the mobile satellite communication terminal includes an indoor terminal for carrying out transmission or reception of a signal through a ground radio link and a repeater terminal installed in such a location that the repeater terminal can get an unobstructed view of a satellite for carrying out transmission or reception of a signal through a satellite communication link. In an outdoor mode, an antenna of the indoor unit is replaced by an antenna for the satellite communication link, whereby the indoor terminal can be used as an outdoor terminal.

7 Claims, 5 Drawing Sheets

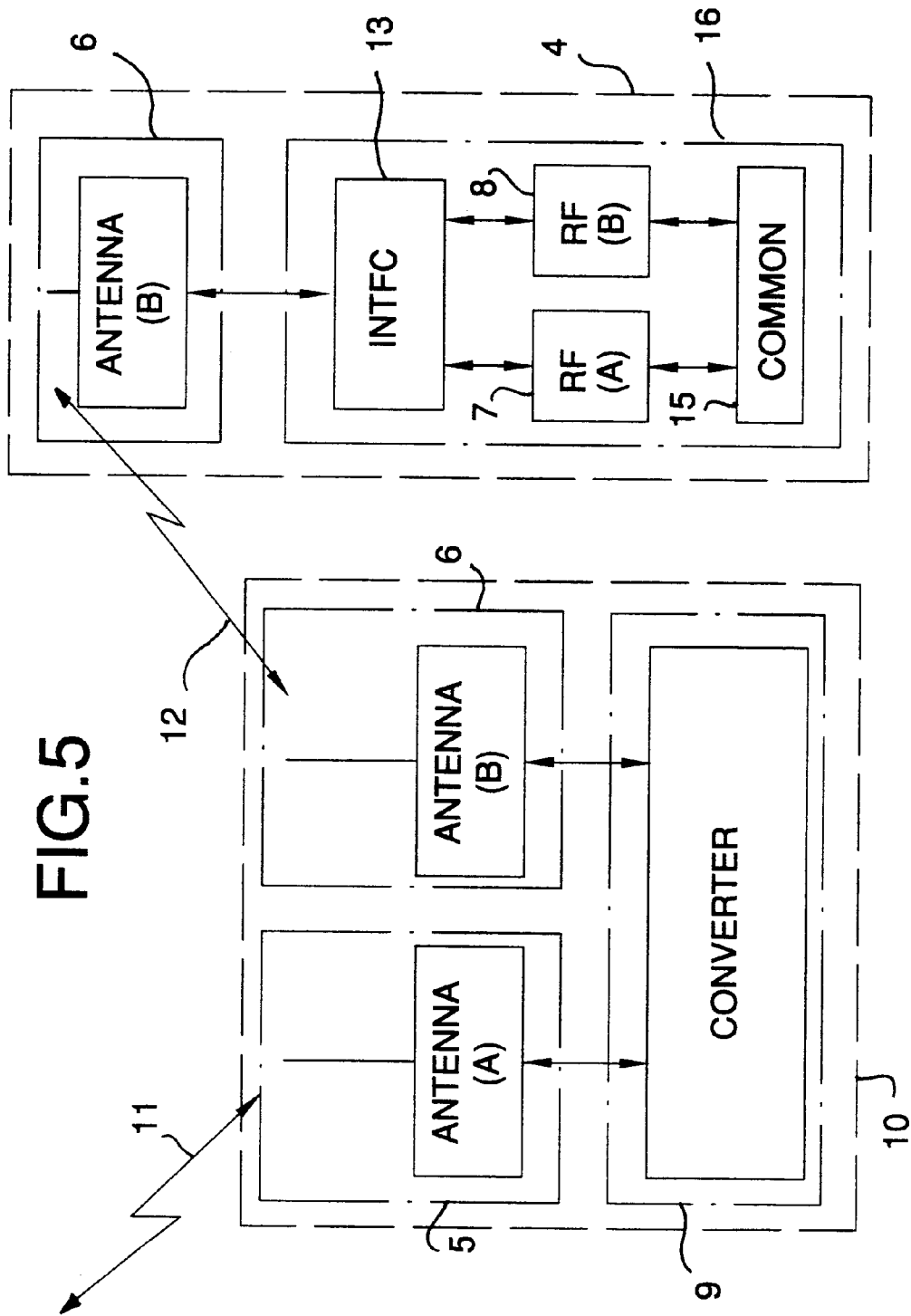

MOBILE SATELLITE COMMUNICATION TERMINAL

This is a Continuation of Application Ser. No. 08/592,690, abandoned on Jan. 26, 1996.

BACKGROUND OF THE INVENTION

The present invention relates to mobile satellite communication terminals for use in a mobile satellite communications system and more particularly, to a mobile satellite communication terminal which can be used not only outdoors but also indoors.

A prior art mobile satellite communication terminal will be explained referring to FIG. 1 showing a diagram for explaining a schematic arrangement of the mobile satellite communications system. The system includes a central earth station 1, a plurality of mobile satellite communication terminals 40-1, 40-2 and 40-3 (which will be sometimes referred to merely as "terminals", hereinafter), and a satellite 2.

More in detail, the terminals 40-1 to 40-3 comprise mobile satellite communication terminals all having the same arrangements and easily portable.

In the illustrated example, one 40-1, e.g., of these terminals 40-1 to 40-3, which is used outdoors, is connected to the central earth station 1 through the satellite 2. In this case, even when moved in between mountains or buildings, the terminal 40-1 can communicate with the central earth station 1 so long as the terminal 40-1 is located within such a range that the terminal can get an unobstructed view of the satellite 2.

In the illustrated example, the terminal 40-2 is installed within such a structure as a building. In this case, when the terminal 40-2 is mounted, e.g., at such a location as in the vicinity of a window 21 that the terminal can get an unobstructed view of the satellite inside of the structure, the terminal can communicate with the central earth station 1 because the attenuation of electromagnetic wave signal caused by the structure is as small as negligible.

Meanwhile, since the terminal 40-3 is positioned at such a location away from the window 21 inside the structure, the terminal cannot get a unbroken view of the satellite 2, the terminal 40-3 cannot transmit send/receive signals with respect to the satellite for the satellite communication.

For the purpose of enabling the terminal 40-3 to attain its communication with the central earth station 1, it is required for the terminal 40-1 to be moved to such a location as in the vicinity of the window that the terminal can receive electromagnetic waves from the satellite as in the case of the terminal 40-2.

As mentioned above, in the prior art mobile satellite communications system, when there is an obstruction which blocks a spatial communication channel or link between the mobile satellite communication terminal and satellite, the communication therebetween becomes impossible. In particular, inside of such a structure as a building, such communication can be established only at such a limited location as in the vicinity of a window.

Thus, even when the mobile satellite communication terminal is of a mobile type, there is a problem that it is impossible to use the terminal with a high flexibility.

An example of the aforementioned mobile satellite communications system is disclosed in a literature, PTC's 93 Proceedings, pp. 835–840, entitled "INMARSAT-M PORTABLE MES."

SUMMARY OF INVENTION

It is therefore an object of the present invention to provide a mobile satellite communication terminal which can attain satellite communication with high flexibility even when the terminal is installed inside of a structure at such a location that the terminal cannot get an unobstructed view of a satellite.

In accordance with an aspect of the present invention, the above object is attained by providing a mobile satellite communication terminal to be located indoors or outdoors for carrying out signal transmission and reception via a satellite, which terminal comprises, in an indoor mode, a repeater terminal installed indoors and having a first antenna for a ground radio link and a second antenna for satellite communication link mounted thereto for converting a signal on the ground radio link into a signal on the satellite communication link, and a mobile unit installed indoors and having the first earth radio link antenna mounted thereto forming an indoor terminal for carrying out transmission or reception of a signal externally connected via the ground radio link; or which terminal comprises, in an outdoor mode, the mobile unit installed outdoors and having the second satellite communication link antenna mounted thereto forming an outdoor terminal for carrying out transmission and reception of a signal externally connected via the satellite communication link, wherein, when the first or second antenna is mounted to the mobile unit, the mobile unit is used as the indoor or outdoor terminal.

BRIEF DESCRIPTION OF THE DRAWINGS

FIG. 5 shows an arrangement when the basic elements of FIG. are combined to realize outdoor communication.

DESCRIPTION OF THE PREFERRED EMBODIMENTS

A mobile satellite communication terminal in accordance with the present invention will be detailed with reference to the accompanying drawings.

Figure 1:
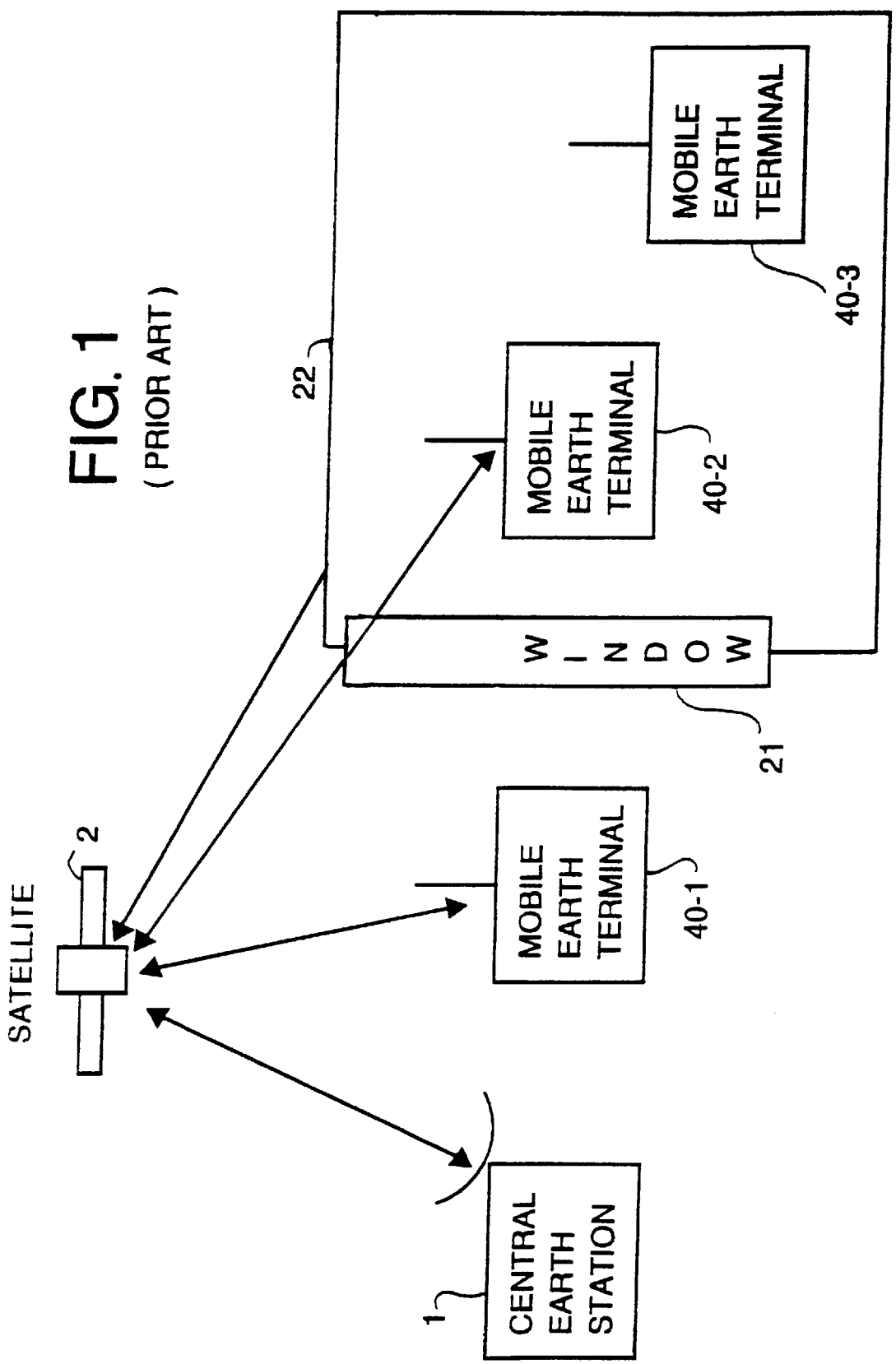
FIG. 1 schematically shows an arrangement of a prior art mobile satellite communications system.
Figure 2:
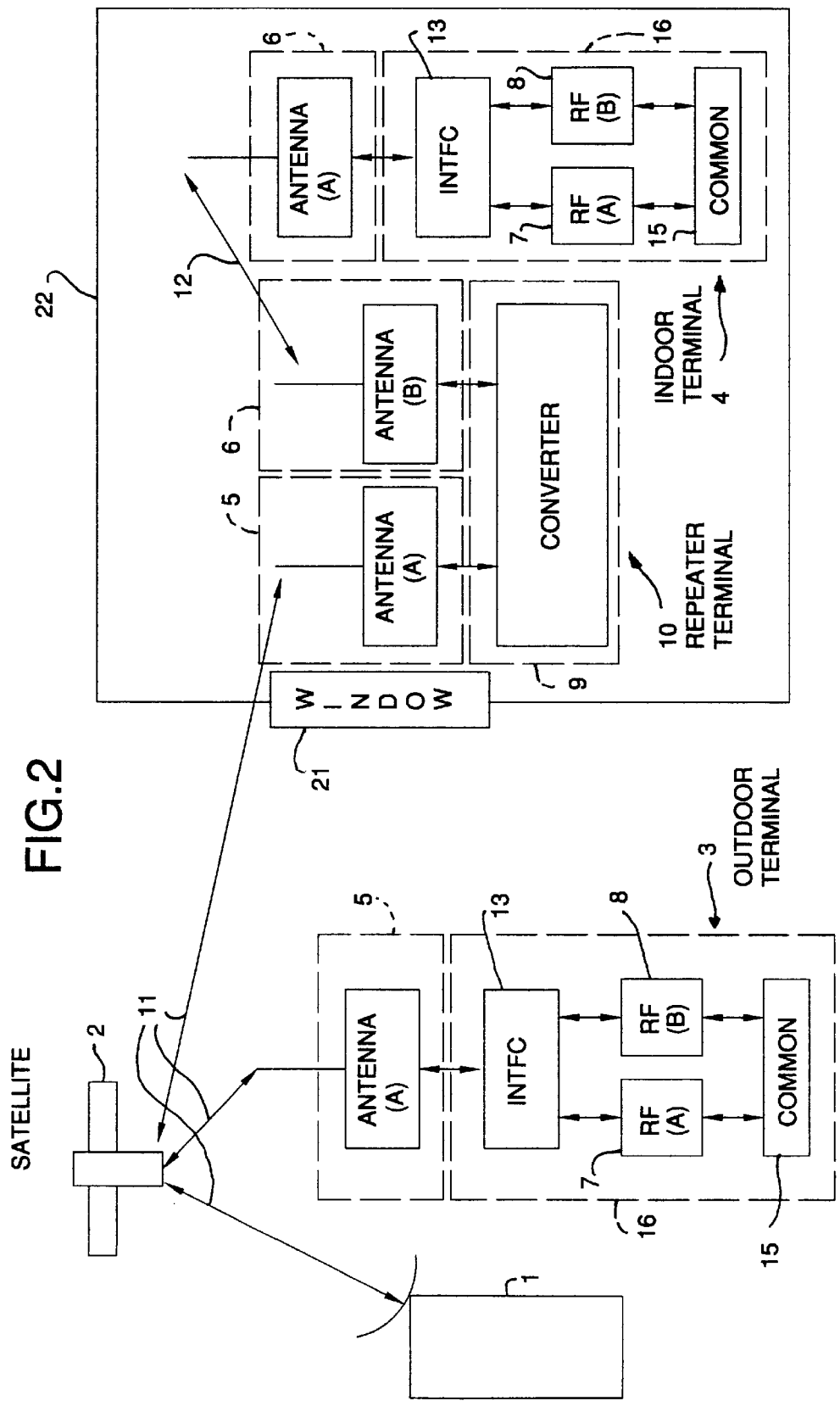
FIG. 2 shows an arrangement of a mobile satellite communications system in accordance with the present invention.

Referring first to FIG. 2, there is shown an arrangement of a mobile satellite communications system which uses the mobile satellite communication terminal of the present invention. In the illustrated example, the mobile satellite communication terminal of the present invention includes, as major constituent elements, two types of terminals, that is, an outdoor terminal 3 or indoor terminal 4 directly connected to a subscriber terminal for transmitting a signal received from the subscriber terminal via a satellite communication link 11 or a ground radio link 12, and a repeater terminal 10 for converting send/receive signals on the satellite communication and ground radio links 11 and 12 into suitable signals.

The outdoor terminal 3 and the indoor terminal 4 have the same structure except for different types of antennas mounted detachably thereto. More specifically, the outdoor terminal 3 has an antenna for satellite communication link mounted thereon, whereas, the indoor terminal 4 has an antenna for the ground radio link.

Such separate use of the mobile terminal as the indoor or outdoor terminal 3 or 4 is for the following reason. A frequency band for use of signal transmission/reception to/from the satellite 2 is usually a microwave or quasi-microwave high-frequency band. Further employed as its modulation system is a quadrature phase shift keying (QPSK) or offset QPSK (OQPSK) modulation system which can efficiently utilize the radio zone and also can operate with a low carrier-to-noise (C/N) ratio. Meanwhile, for the ground radio link between the repeater unit 10 and indoor terminal 4, a relative low frequency band below a VHF band is employed as an operating frequency band to make an antenna directivity as wide as possible, because a distance between the repeater terminal 10 and indoor terminal 4 is very short. For the modulation system, a frequency shift keying (FSK) or frequency modulation (FM) system can be used.

In this way, since the present invention is intended to use two communication links different in application purposes, two types of the outdoor and indoor terminals 3 and 4 are selectively employed.

The ground radio link 12 refers, in the illustrated example, to a radio link which is used exclusively for the indoor communication and to which a relatively low frequency band (such as a VHF band) is allocated in order to realize the indoor communication even when the indoor terminal cannot get an unobstructed direct view of the satellite.

The aforementioned mobile satellite communication terminal is used to form such a mobile satellite communications system as shown in FIG. 2.

More in detail, the repeater terminal 10 is installed, as shown in FIG. 2, inside a structure 22 at such a location that the repeater terminal can get an unobstructed view of the satellite 2, for example, in the vicinity of the window 21. The relay unit 10 has an antenna (A) 5 for signal transmission/reception to/from the satellite 2, an antenna (B) 6 for signal transmission/reception to/from the indoor terminal 4 via the ground radio link, and a converter 9 for converting send/receive signals of the antenna (A) 5 and antenna (B) 6 into suitable sorts of signals. The antenna (A) 5 and antenna (B) 6 are constructed to be mechanically detached from the converter 9.

Also installed inside the structure 22 is the indoor terminal 4 having the removable antenna (B) 6 so that the indoor terminal 4 can transmit and receive signals to and from the repeater terminal 10 through the ground radio link 12.

On the other hand, installed outdoors is the outdoor terminal 3 having the removable antenna (A) 5 so that the outdoor terminal 3 can transmit and receive signals to and from the satellite 2 through the satellite communication link 11. Explanation will then be detailed as to the operation of the mobile satellite communication terminal. The operation of the repeater terminal 10 will first be explained below. In the present invention, the repeater terminal 10 is mounted indoors at such a location that the repeater terminal can get an unobstructed view of the satellite 2 to utilize the satellite communication. The repeater terminal 10 has two antennas of the antenna (A) 5 for the satellite communication link and the antenna (B) 6 for the ground radio link. When it is desired to receive a receive signal from the satellite 2, for example, the repeater terminal 10 directly receives the receive signal at its antenna (A) 5 through the window 21 via the satellite communication link 11, converts the signal into a suitable signal at its converter 9, and then transmits the converted signal from the antenna (B) 6 to the indoor terminal 4 via the ground radio link 12.

This result in that, even when the indoor terminal 4 is installed at such a location that the indoor terminal cannot get an unobstructed view of the satellite 2 at all, the indoor terminal 4 can receive and transmit signals from and to the satellite 2 via the repeater terminal 10.

Explanation will next be made as to the detailed structure of the indoor terminal 4.

The indoor terminal 4 is made up of an antenna (B)6 for the ground radio link, an interface 13, two types of radio frequency parts (RFs) 7 and 8, and a common part 15. In the illustrated example, the interface 13 is provided between the antenna (B)6 and the RF (A) and RF (B) 7 and 8 and has a function of automatically selecting corresponding one of these RFs.

Also provided between the antenna (B)6 and interface 13 is a high frequency connector which mechanically removably connects the antenna and interface.

The interface 13 in the unit 3 or 4 judges whether the antenna connected thereto is the ground radio link antenna (B) 6 or satellite communication antenna (A) 5, and on the basis of its judgement result, selects corresponding one of the RFs 7 and 8.

More specifically, in the indoor terminal 4, the RF (B) 8 for use with a signal on the ground radio link is selected and the associated signal is input or output to or from the common part 15.

The common part 15 has two types of modulation/demodulation functions as well as a baseband processing function. The common part 15, when receiving the signal corresponding to the judged antenna type from the interface 13, selects one of the modulation/demodulation functions for the ground radio link (which function will be referred to as the modulation/demodulation system (B), hereinafter) and for the satellite communication (which function will be referred to as the modulation/demodulation system (A), hereinafter).

More in detail, when the interface 13 judges that the connected antenna is the antenna (B)6 of the indoor terminal 4 and correspondingly receives a detection signal indicative of the fact, the common part 15 selects the modulation/demodulation system (B).

As a result, when it is desired to transmit a voice or data signal from the mobile unit 4 to the central earth station 1, the common part 15 first outputs a modulation signal based on the modulation/demodulation system (B). The modulation signal is converted at the RF (B) 8 into a signal based on the modulation/demodulation system, and then transmitted from the antenna (B) 6 to the repeater terminal 10 through the interface 13.

The repeater terminal 10, on the other hand, receives at its antenna (B) 6 the transmission signal modulated based on the modulation/demodulation system (B) and having a carrier frequency (B). The converter 9, when receiving the transmission signal of the indoor terminal 4 from the antenna (B) 6, converts the carrier frequency (B) of the transmission signal to a carrier frequency (A) as a satellite communication carrier and also the modulation/demodulation system (B) thereof to the modulation/demodulation system (A) as the satellite communication modulation/demodulation system respectively.

An output signal of the converter 9 is sent to its satellite communication antenna (A) 5, from which the signal with the carrier frequency (A) and based on the modulation/demodulation system (A) is transmitted to the satellite 2 via the satellite communication link 11.

When it is desired for the indoor terminal 4 to receive a signal inversely, the repeater terminal 10 first receives from the satellite 2 a modulation signal of the carrier frequency (A) based on the modulation/demodulation system (A).

The repeater terminal 10, after receiving the modulation signal from the satellite 2, converts it to a signal of the modulation/demodulation system (B) having the carrier frequency (B) and transmits the converted signal to the mobile unit 4. The mobile unit 4 receives the signal from the repeater terminal 10 and outputs a received signal.

Explanation will next be made as to a case where the mobile satellite communication terminal of the present invention is used as the outdoor terminal 3. The antenna (A) 5 is mounted to the mobile unit for use with the satellite communication link to form the outdoor terminal 3.

As already explained above, the outdoor terminal has the same structure as that of the indoor terminal except for the antenna. In the outdoor terminal 3, the interface 13 detects that the antenna (A) 5 was mounted thereto, and controls the RF (A) 7 and the common part 15 in such a manner that the carrier frequency (A) is generated and the modulation/demodulation system is changed to the modulation/demodulation system (A).

This results in that the outdoor terminal 3 can realize signal transmission/reception to/from the satellite 2 via the satellite communication link.

With the aforementioned arrangement, the modulation/demodulation system of the indoor terminal for the ground radio link has been made different from that for the satellite communication link. However, the present invention is not limited to the specific example but may be modified so that the modulation/demodulation system for the ground radio link is made to the same as that for the satellite communication link to simplify the arrangement of the mobile satellite communication terminal.

Next, a specific arrangement of the mobile satellite communication terminal in accordance with the present invention will be detailed below.

Shown in FIGS. 3A, 3B, 3C and 3D are replacement units which form major parts of the mobile satellite communication terminal of the present invention.

Figure 3:
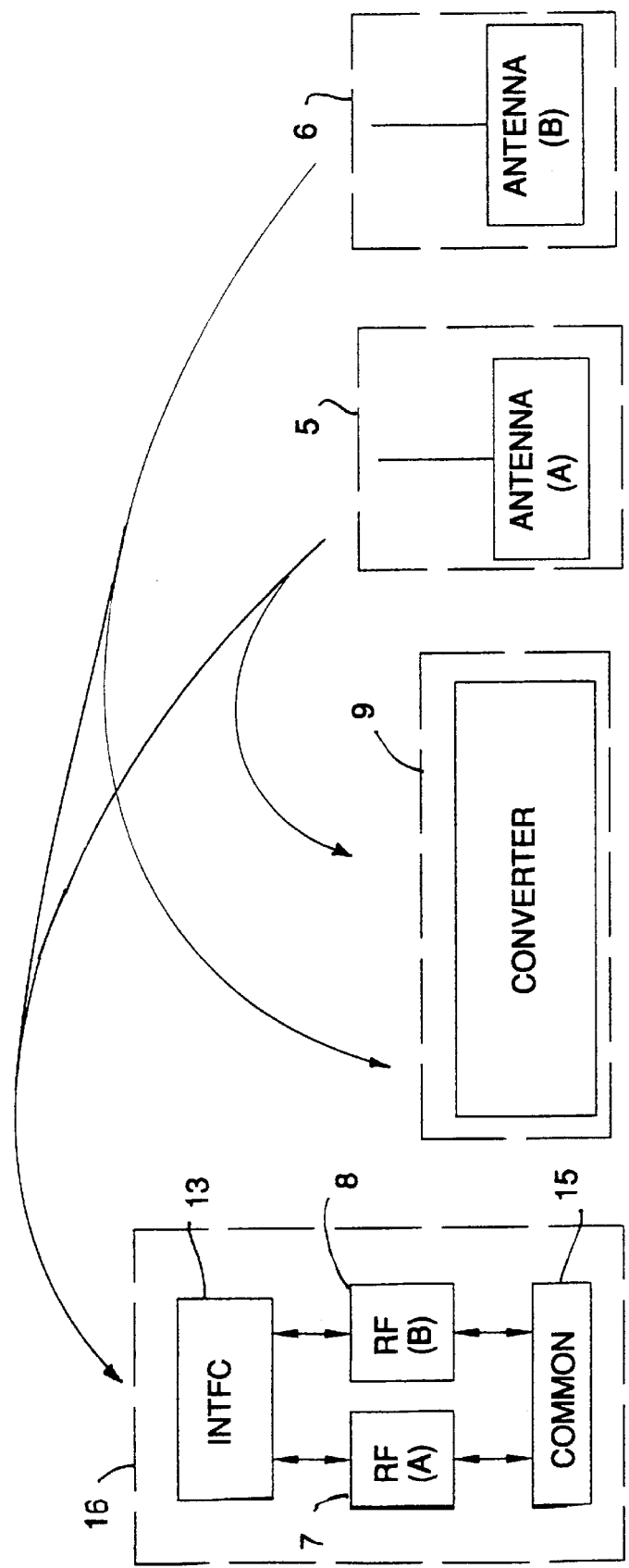
FIGS. 3A, 3B, 3C and 3D show replacement units as basic elements of the present invention respectively.

Referring first to FIG. 3A, there is shown a replacement or mobile unit 16 in the mobile satellite communication terminal. In this case, such an antenna (A) 5 or antenna (B) 6 as shown in FIG. 3C or 3D is connected to the mobile unit 16 by means of a coaxial connector.

It is also assumed in this case that the interface 13 has a function of selecting one of the modulation/demodulation systems of the RF (A) 7, RF (B) 8 or common part 15 according to the type (the antenna (A) 5 or antenna (B) 6) of the antenna connected thereto. In an exemplary method for detecting the antenna type, separate connectors are previously provided for the mounting of the antenna (A) 5 and antenna (B) 6 to the interface 13, so that the interface 13 can detect different impedances of the attached connectors and thus can know or judge the type of the antenna actually mounted thereto based on the detected impedance.

In another antenna detecting method, for the purpose of implementing an economical and small-size mobile satellite communication terminal, a single common connector is used for the mounting of both the antennas to the interface 13 so that only one of these antennas is previously set to cause completion of a D.C. loop of a signal line of the interface 13, whereby the mounted antenna can be identified by detecting a current flowing the D.C. loop. The RF (A) 7 comprises a high frequency circuit for the satellite communication link which has a function of performing amplifying and frequency converting operation over a high frequency signal.

Similarly, the RF (B) 8 comprises a high frequency circuit for the ground radio link.

The high frequency signal for the satellite communication link usually requires the transmitter side to have a large power amplifying function and the receiver side to have a low-noise amplifying function. Meanwhile, the high frequency signal for the ground radio link requires no such functions, for which reason the signal for the ground radio link is independently prepared.

The common part 15 functions to perform its modulating/demodulating operation over a signal of an intermediate frequency band subjected to a frequency conversion by the RF (A) 7 or RF (B) 8 or to perform its baseband signal processing operation to form an external interface of send/receive signals.

Figure 4:
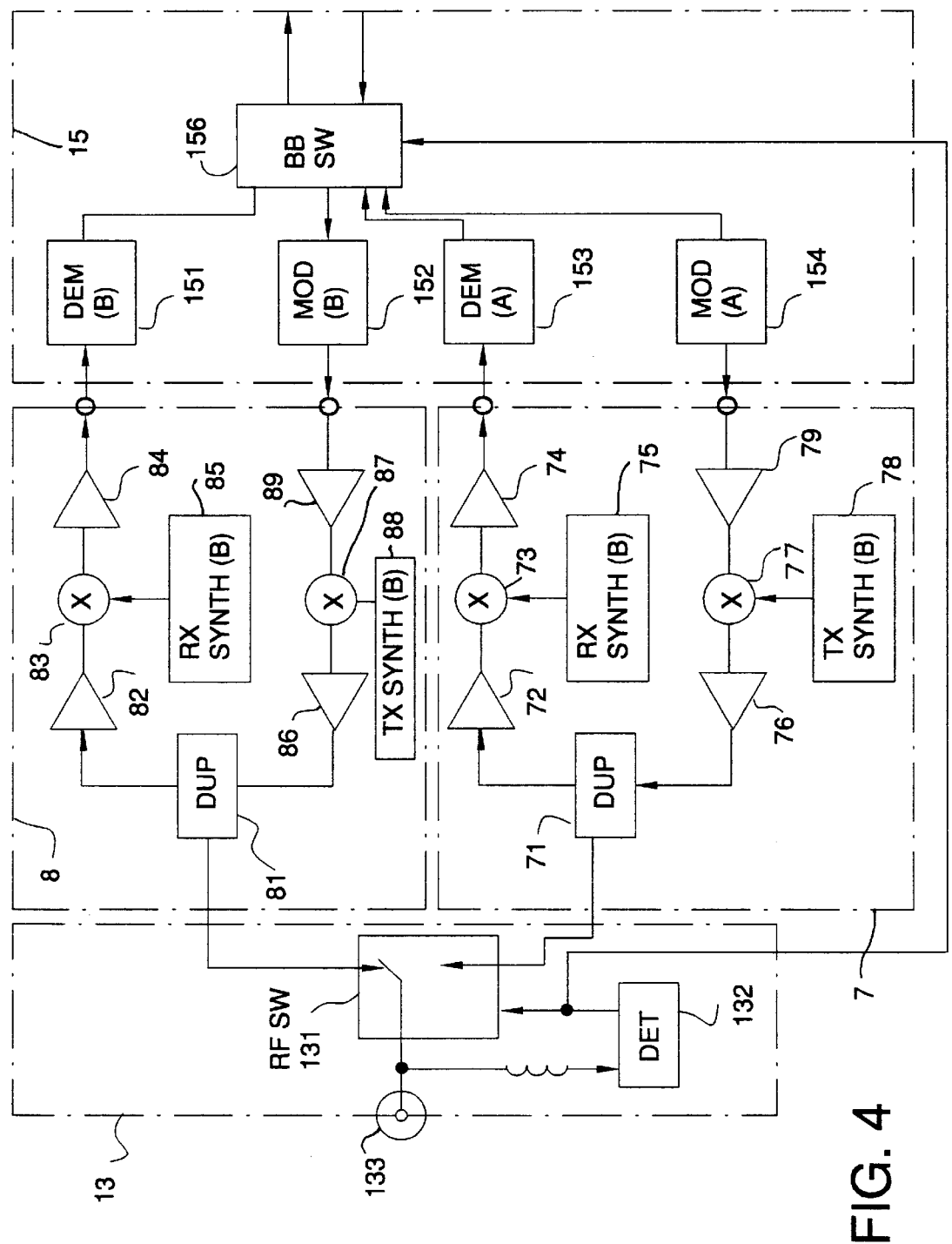
FIG. 4 shows a detailed structure of a mobile unit 16.

FIG. 4 shows a structure of the mobile unit 16 in which the interface 13 is connected to the antenna (A) 5 or antenna (B) 6 through a coaxial connector 133. An antenna detection circuit 132 detects the type of the antenna connected thereto and controls a high frequency switch 131 based on its detected output.

This high frequency switch may comprises a pin diode switch in its simple form. The RF (A) 7 receives a receive signal from the high frequency switch 131 at its circulator 71, amplifies the signal at a low-noise amplifier 72, and then perform its frequency converting operation at a mixer 73 over the signal to obtain a signal of an intermediate frequency band. Reference symbol RX SYNTH(A) 74 denotes a synthesizer for the frequency conversion. The receive signal of the intermediate frequency band is demodulated by a DEM(A) 153 to obtain a baseband signal.

Meanwhile, in the transmitter side, a baseband signal is modulated by an MOD(A) 154, amplified by an intermediate frequency band amplifier 79, frequency-converted by a TX SYNTH(A) 78 and a mixer 77, amplified by a high frequency amplifier 76, and then sent to the circulator 71. This send signal is sent through the high frequency switch 131 to the output terminal 133, from which the signal is externally output. Since the RF (B) 8 has the same structure as the RF (A) 7, detailed explanation thereof is omitted.

The common part 15 has satellite communication modulation and demodulation circuits MOD(A) 154 and DEM(A) 153 and earth radio wave modulation and demodulation circuits MOD(B) 152 and DEM(B) 151. Under control of detection output of the antenna detection circuit 132 a baseband switch BB SW 156 is controlled to perform change-over to the satellite communication or earth radio communication.

Next, the converter 9 shown in FIG. 3B has a function of performing frequency conversion between the satellite communication and ground radio wave links. The converter 9 has such a structure that the antenna (A) 5 and antenna (B) 6 for use in the mobile satellite communication terminal can be mounted to the converter 9 or can be replaced by a single common antenna as mounted to the converter 9, whereby the antenna economy can be improved in the entire mobile satellite communication terminal.

FIGS. 3C and 3D show the antenna (A) 5 and antenna (B) 6 which are respectively independent signal transmitting and receiving antennas. The antennas are connected to the interface 13 and converter 9 both by means of coaxial connectors for the send/receive signals.

Shown in FIG. 5 is an arrangement of the above mobile satellite communication terminal when the terminal is used indoors to transmit/receive signals to and from the satellite. In the illustrated repeater terminal 10, the antenna (A) 5 and antenna (B) 6 are mounted to the converter 9. In the illustrated indoor terminal 4, on the other hand, the antenna (B) 6 is mounted to the mobile unit 16.

As explained above, signal transmission and reception can be realized between the indoor terminal 4 and repeater terminal 10 through the ground radio link 12, while signal transmission and reception can be realized between the repeater terminal 10 and satellite 2 through the satellite communication link 11.

As a result, when it is desired to freely want to do satellite communication inside a structure, this can be established by combining the mobile unit 16 and antenna (B) 6 to form the indoor terminal 4 and by combining the converter 9 and antenna (A) 5 to form the repeater terminal.

Meanwhile, when it is desired to perform the satellite communication outside the structure, i.e., outdoors, this can be attained by combining the mobile unit 16 and antenna (A) 5 to form the outdoor terminal 3.

Thus, when there are prepared, at least, one of the common part 15, one of the antenna (A) 5, two of the antennas (B) 6 and one of the converter 9; the satellite communication can be readily utilized even in any application environments.

It goes without saying that although the outdoor terminal 3 has been used only outdoors in the foregoing embodiment, the present invention is not restricted to the specific example but the outdoor terminal 3 may be positioned inside a structure as in the repeater terminal 10 to directly receive or transmit signals from or to the central earth station 1 via the satellite, so long as the outdoor terminal 3 can get an unobstructed view of the satellite.

Similarly, the provision position of the indoor terminal 4 is not limited to indoor one but it can be located outdoors to perform its transmitting and receiving operations with another indoor terminal 4 of another user located indoors, as a matter of course.

It is also a matter of course that the indoor terminal 4 and repeater terminal 10 are both used outdoors to carry out the satellite communication.

As has been explained in the foregoing, in accordance with the present invention, the satellite communication can be utilized by using the satellite communication and ground radio link antennas having an exchangeability in any application environments including indoors and outdoors, whereby the feasibility of the present invention as the mobile satellite communication terminal can be fully demonstrated advantageously.

What is claimed is:

1. An indoor/outdoor mobile satellite communication terminal to be located indoors or outdoors for carrying out signal transmission and reception via a satellite, comprising:

a repeater terminal installed indoors and having a first detachable antenna for a ground radio link and a second detachable antenna for a satellite communication link mounted thereto, said repeater terminal including a signal converter for converting a ground radio signal into a satellite communication signal and for converting a satellite communication signal into a ground radio signal; and a mobile unit having a first detachable antenna, wherein, when said first detachable antenna of said mobile unit is mounted to said mobile unit, said mobile unit forms an indoor terminal for carrying out transmission or reception of a satellite communication signal via said ground radio link with said repeater terminal, and a second detachable antenna, wherein, when said second detachable antenna of said mobile unit is mounted to said mobile unit, said mobile unit forms an outdoor terminal for carrying out transmission and reception of a satellite communication signal via a direct satellite communication link, wherein said first detachable antenna of said mobile unit and said second detachable antenna of said mobile unit are exchangeable with each other, such that said mobile satellite communication terminal can be used in either one of an outdoor mode and an indoor mode depending on which one of said first and second detachable mobile unit antennas is mounted to said mobile unit.

2. A mobile satellite communication terminal as set forth in claim 1, wherein said converter is connected with said first and second repeater terminal antennas for alternatively converting between said ground radio signal which has a first transmit/receive frequency and said satellite communication signal which has a second transmit/receive frequency.

3. A mobile satellite communication terminal as set forth in claim 1, wherein said repeater terminal is installed at a location where the repeater terminal can get an unobstructed view of said satellite.

4. A mobile satellite communication terminal as set forth in claim 1, wherein said mobile unit has an automatic selector for automatically selecting a first transmit/receive and a first modulation/demodulation system when said first detachable mobile unit antenna is mounted thereto, and for automatically selecting a second transmit/receive frequency and a second modulation/demodulation system when said second detachable mobile unit antenna is mounted thereto.

5. A mobile satellite communication terminal as set forth in claim 4, wherein said mobile unit includes an interface connected to said first or second mobile unit antenna by means of a coaxial connector, a first high frequency circuit connected to said interface for generating the first transmit/receive frequency, a second high frequency circuit connected to the interface for generating the second transmit/receive frequency, and a common part connected to said first and second high frequency circuits for performing its modulating and demodulating operations to form an interface with an external subscriber terminal; and wherein said interface has a high frequency switch for detecting which of said first or said second antenna is connected thereto and for selecting either the first or second high frequency circuit in accordance with a type of detected antenna and a control circuit for sending a detection signal to said common part and selecting a baseband switch in order to select either the first or second modulation/demodulation system in accordance with the type of detected antenna.

6. A mobile satellite communication terminal as set forth in claim 4, wherein said first transmit/receive frequency is set in a low frequency band below VHF band.

7. A mobile satellite communication terminal as set forth in claim 4, wherein said first modulation/demodulation system is set to be the same as said second modulation/demodulation system.

* * * * *